United States Patent
Tokimoto et al.

(10) Patent No.: US 7,167,157 B2
(45) Date of Patent: Jan. 23, 2007

(54) INPUT DEVICE FOR IMPROVING MAN-MACHINE INTERFACE

(75) Inventors: Toyotaro Tokimoto, Yokohama (JP); Oishi Masatoshi, Yokohama (JP)

(73) Assignee: Avix Inc., Kanagawa (JP)

( * ) Notice: Subject to any disclaimer, the term of this patent is extended or adjusted under 35 U.S.C. 154(b) by 566 days.

(21) Appl. No.: 10/097,083

(22) Filed: Mar. 14, 2002

(65) Prior Publication Data

US 2002/0099453 A1 Jul. 25, 2002

Related U.S. Application Data

(63) Continuation of application No. 09/035,617, filed on Mar. 5, 1998.

(30) Foreign Application Priority Data

Mar. 14, 1997 (JP) .............................. 9-61176

(51) Int. Cl.
*G09G 5/00* (2006.01)

(52) U.S. Cl. ........................ 345/156; 345/161; 345/163
(58) Field of Classification Search ................ 345/179, 345/156, 163, 161, 167; 74/471 XY
See application file for complete search history.

(56) References Cited

U.S. PATENT DOCUMENTS

| | | | |
|---|---|---|---|
| H703 H | | 2/1968 | Repperger et al. |
| 3,523,665 A | | 2/1968 | Laynor et al. |
| 3,862,730 A | | 1/1975 | Heiney |
| 4,071,209 A | | 1/1978 | Hart |
| 4,168,045 A | | 9/1979 | Wright et al. |
| 4,477,043 A | * | 10/1984 | Repperger ............... 244/223 |
| 4,477,044 A | | 10/1984 | Darcy et al. |
| 4,632,341 A | * | 12/1986 | Repperger et al. .......... 244/230 |
| 4,861,269 A | | 8/1989 | Meenen |
| 5,410,232 A | * | 4/1995 | Lee ..................... 318/568.11 |
| 5,721,566 A | | 2/1998 | Rosenberg et al. |
| 5,875,631 A | * | 3/1999 | Smith ....................... 60/444 |
| 6,271,828 B1 | * | 8/2001 | Rosenberg et al. ......... 345/156 |
| 6,417,837 B1 | * | 7/2002 | Baba ....................... 345/157 |

FOREIGN PATENT DOCUMENTS

| | | |
|---|---|---|
| JP | 05-216583 | 8/1993 |
| KR | 9-5-2004-053173526 | 12/2004 |

* cited by examiner

*Primary Examiner*—Amr A. Awad
*Assistant Examiner*—Alecia D. Nelson
(74) *Attorney, Agent, or Firm*—Jones Day

(57) ABSTRACT

An input device for improving man-machine interface, for use in connection with a data processing system such as a computer, is disclosed. The input device provides a more direct and natural relationship between the control movements of an operator and the output from the data processing system. The input device according to one embodiment of the present invention includes a fluid medium 20 sealed inside a chamber 10, a control movement transmission mechanism 50 connected to the chamber 10, a control data generating device 60 which monitors and converts the operation of the inflow and outflow control mechanism into electrical signals, a transmission circuit 70 for transmitting the signals output by the control data generating device 60 to a computer 100, a fluid flow variable restriction device 40 able to variably control the volume of fluid flowing through the restrictor pipe 30, and a receiver circuit 80 capable of driving the fluid flow variable restriction device 40 based on control response signals output from the computer 100. The fluid medium 20 flows into and out of the chamber 10 through the restrictor pipe 30. The mechanism operates in a manner as to control the fluid flow into and out of the chamber 10 through the restrictor pipe 30. The fluid flow condition is generated by operator-induced volume changes in the chamber 10.

9 Claims, 5 Drawing Sheets

INPUT DEVICE FOR IMPROVING MAN-MACHINE INTERFACE

This is a continuation, of application Ser. No. 09/035,617, filed Mar. 5, 1998.

BACKGROUND OF THE INVENTION

1. Field of the Invention

The present invention relates to a man-machine interface, also referred to as an input device, of the type generally used to manually input control signals to a computer or other data processing systems.

2. Description of the Related Art

Manually controlled signal input devices used with data processing systems often take the form of pointing devices typically including a mouse or joystick. These pointing devices are controlled by a human operator in order to control movement of a cursor on a computer screen, or to control graphic elements on a video game display screen. These pointing devices have commonly taken the form of a rotatable ball, pivoting lever, or push-buttons which serve as control data input means whereby the physical movements of the human operator are converted into corresponding changes in electrical input signals. These electrical signals are then input to a host device, through a signal transmission circuit, as a means of transmitting control data. The host device receives the control data signals and responds by executing a data processing operation which results in the corresponding movement of a graphic element on the display screen.

While the pointing devices are capable of inputting data to the host device in response to physical inputs from the human operator, their response characteristics remain constant even though various operating conditions, such as changes in the display or cursor speed, may fluctuate. As a result, a feeling of direct and natural response is lacking between the operation of the pointing device and corresponding output of the host device as viewed by the graphic conditions displayed on the screen. This lack of natural response results in a non-direct feeling of control and low level of interface between the human operator and the apparatus. As a result, persons unfamiliar or unskilled in the use of a data processing or other computer-controlled devices have trouble adapting to their operation, and often give up before the necessary skill is attained. Furthermore, people who become skilled in the operation of the devices are forced to adapt to the shortcomings of conventional pointing devices, and in doing so expend time and effort in developing a skill which should be unnecessary. As computers and other types of data processing equipment are steadily becoming a more integral part of everyday life in what is becoming an age of multimedia data presentation, it is only reasonable to expect a more direct and natural interface between the human operator and the machine.

SUMMARY OF THE INVENTION

One object of the present invention is to provide a means of forming an improved interface between the human operator and the machine through an input device capable of providing a more direct and natural feeling of connection between the control movements of the human operator and the corresponding screen display as output by a data processing device.

According to one aspect of the present invention, an input device for providing information with a data processing system comprises means for containing fluid medium in a hermetically sealed manner, means for communicating the fluid medium going out from or coming into the containing means, means for restricting flow of the fluid medium passing through the communicating means, means for applying pressure to the fluid medium responsive to direct or indirect inputs from an operator so as to change volume of the fluid medium contained in the containing means, means for generating control information responsive to operation of the pressure applying means by the operator, and means for generating feedback information responsive to control information input from the control information generating means. The fluid medium is passed through the communication means in response to the operation by the operator through the pressure applying means. The control information representing the operation by the operator is input to the data processing system. The restricting means restricts the flow of the fluid medium through the communication means responsive to the feedback control information fed by the feedback information generating means corresponding to the control information.

According to another aspect of the present invention, an input device for improving man-machine interface comprises a sealed chamber connected to a restrictor pipe which serves as a passageway for fluid flow from or into the chamber, a control movement transmission mechanism wherein direct or indirect control inputs from an operator result in changes in the volume of fluid in the chamber, the changes being induced by an inflow or outflow of fluid through the restrictor pipe, a control data generation means capable of physically monitoring the operation of the control movement transmission mechanism and converting that operation into corresponding electrical signals, a transmission circuit through which the signals generated by the control data generation means are fed to a host device, a fluid flow variable restriction means capable of electrically and variably controlling the fluid flow status in the restrictor pipe, and a receiver circuit capable of driving the fluid flow variable restriction means through the application of a control response signal applied to the restriction means from the host device.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF PREFERRED EMBODIMENTS

Figure 1:
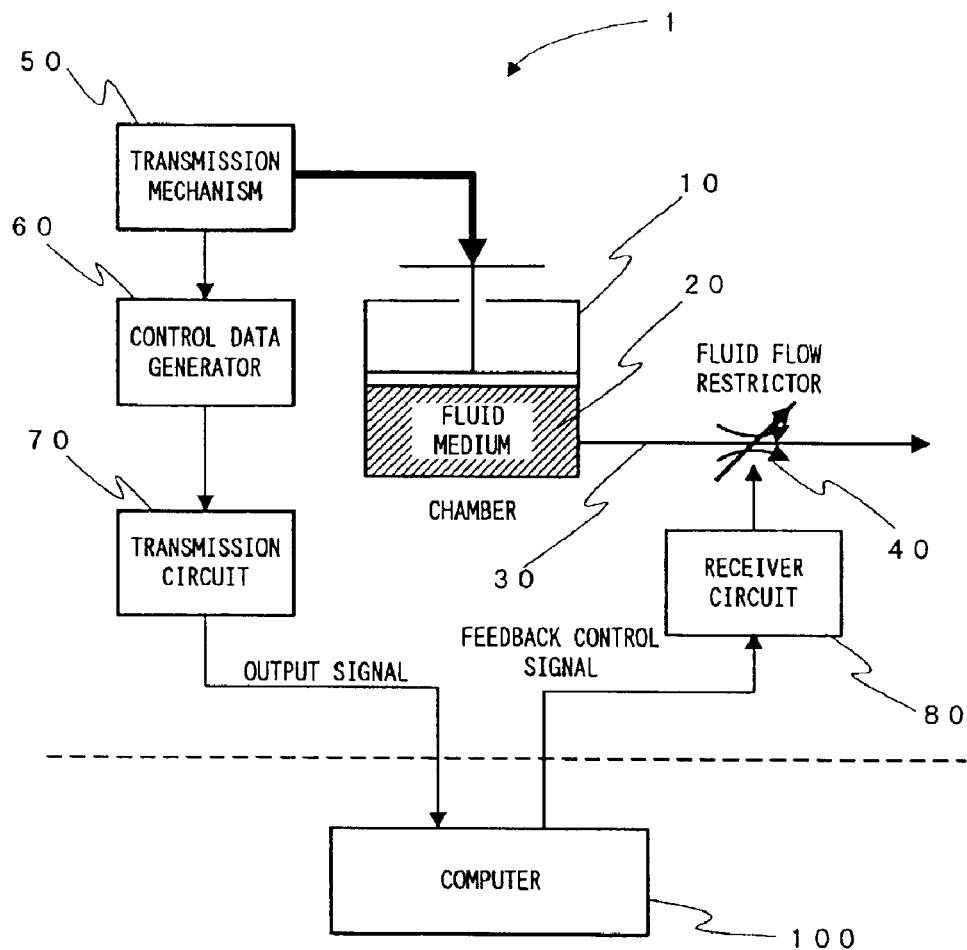
FIG. 1 is a schematic representation of the principal operating means of the invention.

FIG. 1 represents a schematic view of the general operating principle of the man-machine interface of the present invention. Fluid medium 20, composed of air, oil, or other fluid substance, is sealed within a chamber 10 in a manner whereby physical force applied externally to the chamber 10 results in a change of its internal volume. A restrictor pipe 30 is connected to the chamber 10 and is of sufficiently small cross section with relation to the surface area of the chamber 10 so as to allow the fluid medium 20 to flow into and out of the chamber 10 through the restrictor pipe 30. A control movement transmission mechanism 50 is a device which, when physical force is applied thereon by an operator, either directly or indirectly induces changes in the internal volume of the chamber 10, thus causing the fluid medium 20 to exit or enter the chamber 10 through the restrictor pipe 30. Moreover, the control movement transmission mechanism 50 is also connected to a control data generation means 60 which monitors and converts the mechanical control movements of the mechanism 50 into electrical signals. These signals are fed to a transmission circuit 70 which serves as the interface part between the signal input device 1 and a computer host device 100.

The computer host device 100 appropriately outputs an operational response control signal to fluid flow variable restriction means 40 through a receiver circuit 80. The restriction means 40 utilizes the aforesaid response control signal as a drive signal which is applied, by restriction means 40, to change the flow rate of the fluid medium 20 within the restrictor pipe 30. This operation results in changes in the internal volume of the chamber 10 with resultant changes in the response characteristics of the control movement transmission mechanism 50 which, in turn, are felt by the operator.

First Embodiment

Figure 2:
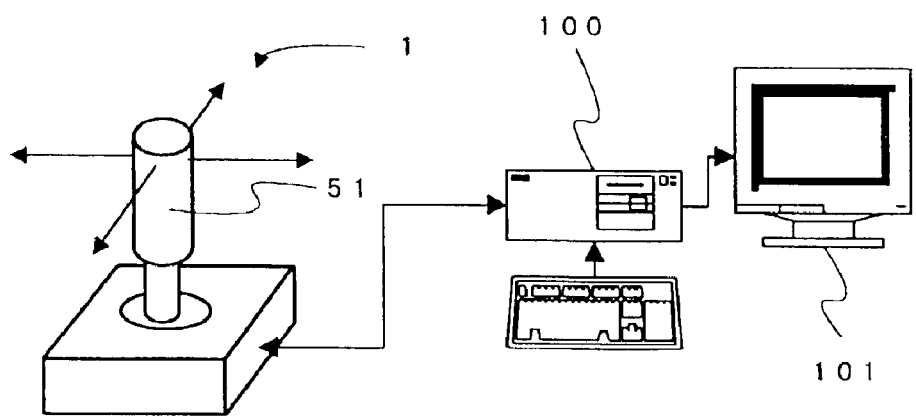
FIG. 2 is an abbreviated diagram of the first embodiment of the invention as the external input control device of a data processing system.

FIG. 2 shows a first embodiment of the input device invention in relation to the computer host device 100 to which it is connected therewith. An input device 1 is a pointing device structured as what is commonly referred to as a joy stick. A display 101 is connected to the computer host device 100 and displays cursor movement corresponding to the output of the input device 1. A lever 51, being manually operable, is installed to and protrudes from the upper part of the input device 1, and is supported at its base so as to be freely pivotable to any desired angle. Resultingly, the angular movement of the lever 51 corresponds to two dimensional display movements on the display 101. Moreover, the angle and speed of movement of the lever 51, in any direction starting from its perpendicular position, results in movement of the display cursor at a corresponding angle and speed.

Figure 3A:
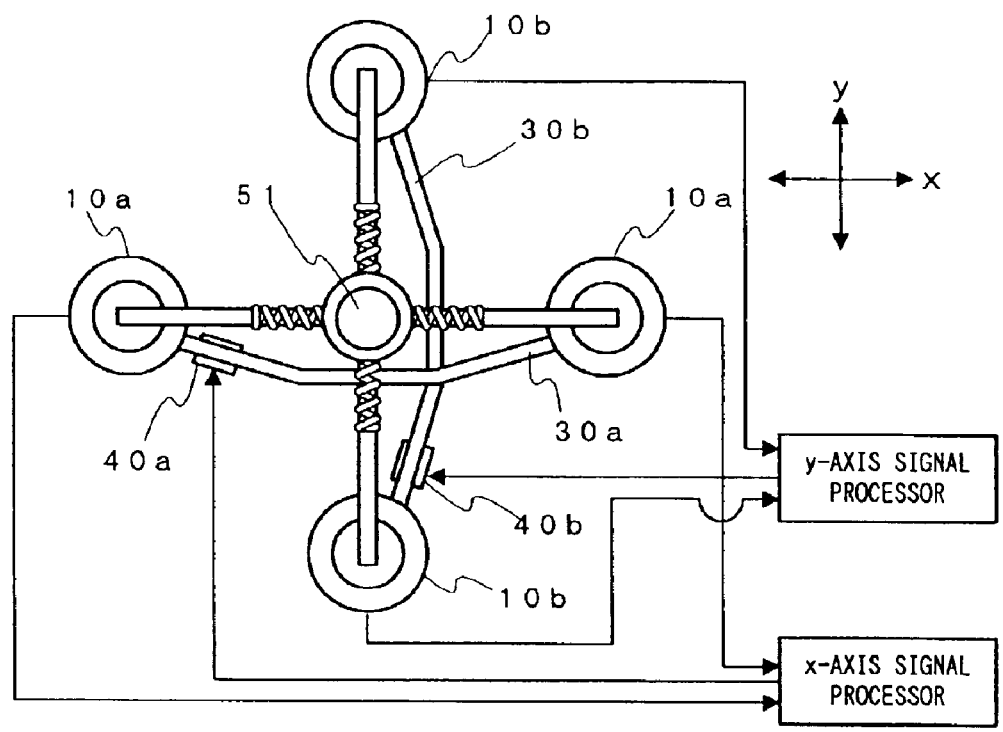
FIGS. 3A and 3B are an overhead view and a lateral view with partial cross section respectively, showing the operation and functions of the first embodiment of the invention as a manually controlled input device.
Figure 3B:
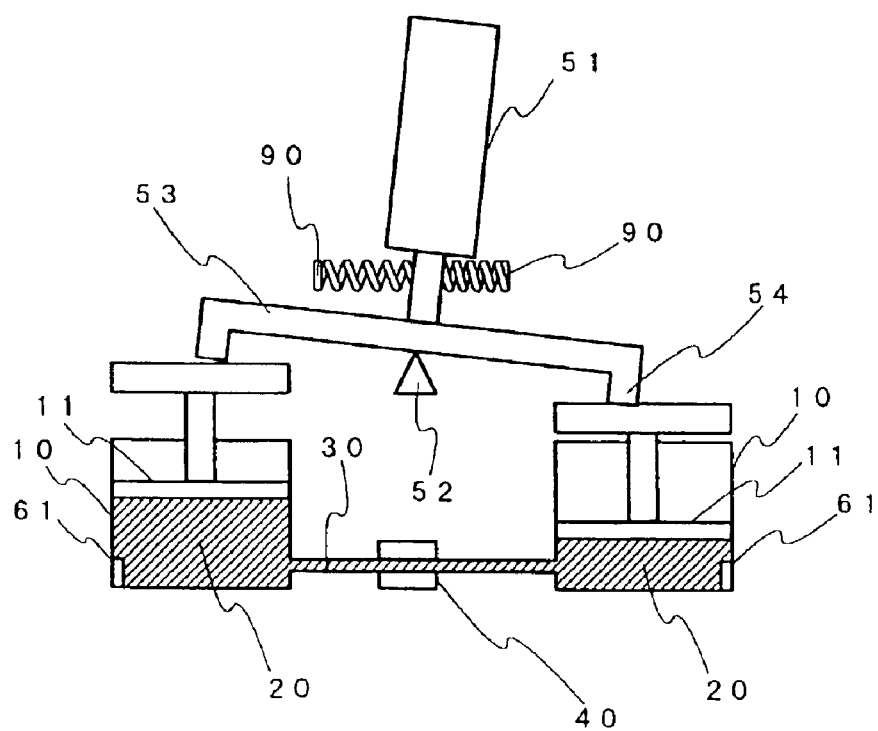

The structure of the input device 1 is shown in FIGS. 3A and 3B. FIG. 3A is a top view of the input device with the lever 51 being in an upright position which can be viewed as perpendicular to the paper surface on which the diagram is drawn. The free angular pivoting movement of the lever 51 is divided into X and Y axes and therefore can be monitored as movement on these two axes. Chambers 10a and 10b are oriented on the X and Y axes and are connected by restrictor pipes 30a and 30b respectively. In this manner, the chambers 10a and 10b are respectively connected to X and Y axis signal processing systems, the processing systems corresponding to the aforesaid control data generation means and transmission and receiver circuits. Resultingly, two systems are formed, one responding to lever movement on the X axis, and the other to lever movement on the Y axis.

FIG. 3B shows the structure of one of the aforesaid lever movement transmission systems. The chambers 10 are connected by the restrictor pipe 30, and contain appropriate viscosity fluid 20 sealed therein. Each of the chambers 10 is formed as a cylindrical construction housing a piston 11 which is movable in an upward or downward direction, and when moved causes changes in the volume of fluid 20 in the chambers 10. The lever 51 is fixedly connected to an arm 53 which is in turn supported at its center point by a fulcrum 52. End parts 54 are formed at the extremities of the arm 53 and are oriented so as to be in contact with the top part of the pistons 11, thus resulting on pressure being applied to the top part of the piston 11 when the lever 51 is moved.

Because the cross section of the restrictor pipe 30 is significantly smaller than the surface area of the fluid chambers 10, fluid flow is partially restricted when fluid 20 passes through the restrictor pipe 30 and thus results in a rise in pressure within the chamber 10. This pressure rise is monitored by a voltage element 61 which responds by emitting a specific voltage level based on that rise in pressure. Thus, the voltage output emitted by the voltage element 61 in the chamber 10 serves as a means of detecting the movement of the lever 51, and the value of that voltage output corresponds to the degree of inclination of the lever 51. Moreover, the speed of inclination of the lever 51 can be monitored through an operation whereby the voltage value output by the aforesaid voltage element 61 is sampled at appropriate time intervals to establish time dependent monitoring of pressure changes. The voltage wave generated by the voltage element 61 is pre-processed and fed to the host computer device, as control data, through the aforesaid transmission circuit. The host computer device then generates a response control signal in response to the input of the aforesaid control data. While the aforesaid control data and response control signal may be generated as analog or digital signals, the use of digital signals will call for an appropriate analog-to-digital or digital-to-analog converter in the aforesaid signal processing system.

Fluid flow variable restriction means 40 is installed to the restrictor pipe 30 and is structured as a pipe configuration orifice-type voltage driven actuator. This voltage driven actuator receives the aforesaid response control signal through the receiver circuit, and responds to that signal by radially constricting the cross section of the restrictor pipe 30 along the pipe's axial direction by means of changing the size of the aperture of the aforesaid orifice. The use of a non-pipe configuration orifice adjustment mechanism, without the aforesaid voltage driven actuator, can also be employed as a variable restriction control means. In this embodiment, a large change in the inclination angle or a rapid movement of the lever 51 will cause a correspondingly large change in the electrical displacement value of the voltage driven actuator.

Furthermore, in this embodiment of the invention, releasing the lever 51 will result in the lever returning to its perpendicular position through a base point return means whereby the fluid volume in the chamber 10 returns to an initial base volume. This base point return means may comprise a spring 90 which is oriented so as to apply pressure from all four directions of lever movement toward the base point position. The aforesaid base point return means may also comprise springs which apply pushing or pulling pressure to the top of the pistons 11 in the chambers, thereby returning the fluid volume in the chambers 10 to a base volume when no pressure is being applied to the lever 51.

Second Embodiment

Figure 4:
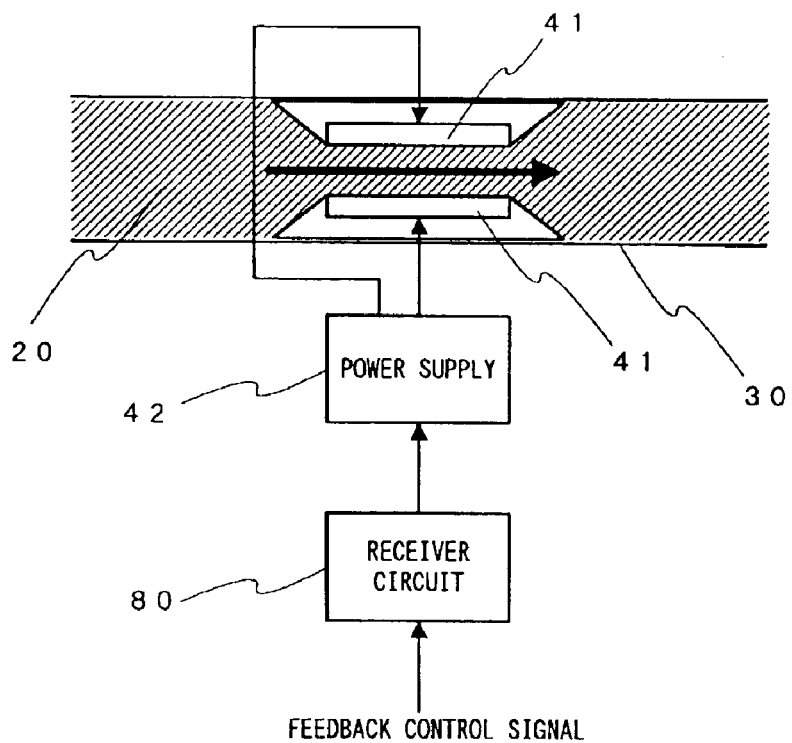
FIG. 4 is a diagram showing the structure of the fluid flow variable restriction means as used in the second embodiment of the invention.
Figure 5:
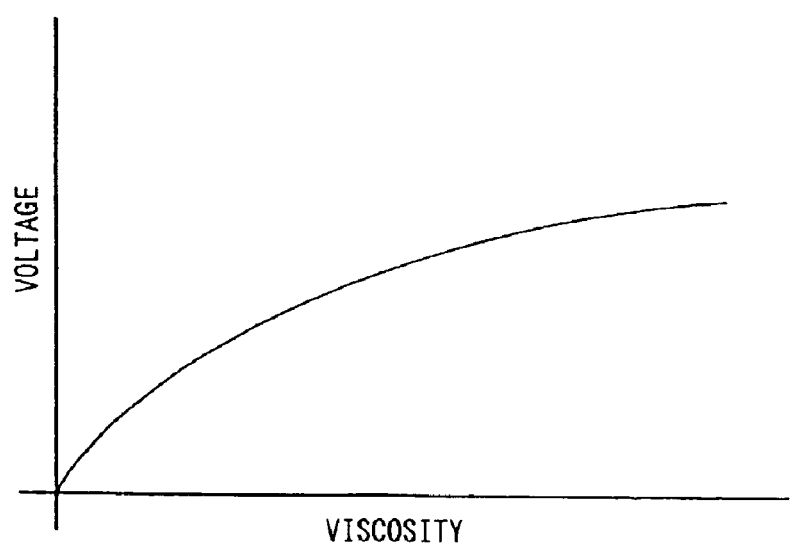
FIG. 5 is a graph showing the relationship between an applied voltage and viscosity of the electroviscous fluid used in the second embodiment.

FIG. 4 shows a second embodiment of the invention in which a different structure of the aforesaid fluid flow variable restriction means is shown in a schematic form. Electrodes 41 are installed in mutually opposed orientation on the constriction pipe 30 so as to form a restricting orifice for the passage of sealed-in fluid medium 20, in this embodiment the fluid medium 20 being a fluid with electroviscous properties, hereafter termed EV fluid. A power supply 42 is installed as a means of providing drive power for the fluid flow variable restriction means. The response characteristics of the EV fluid 20 are shown in FIG. 5. The viscosity of the EV fluid existing between the mutually opposed electrodes 41 will increase as the applied voltage value emitted by the opposed electrodes becomes higher, thus making possible a function whereby the viscosity of the EV fluid can be changed through the application of a voltage-based control response signal to the mutually opposed electrodes 41. This type of control operation makes it possible to freely restrict the flow characteristics of the EV fluid. The power supply 42 provides means of supplying the high voltage which is needed by the fluid flow variable restriction means to electrically alter the flow characteristics of the EV fluid.

Figure 6:
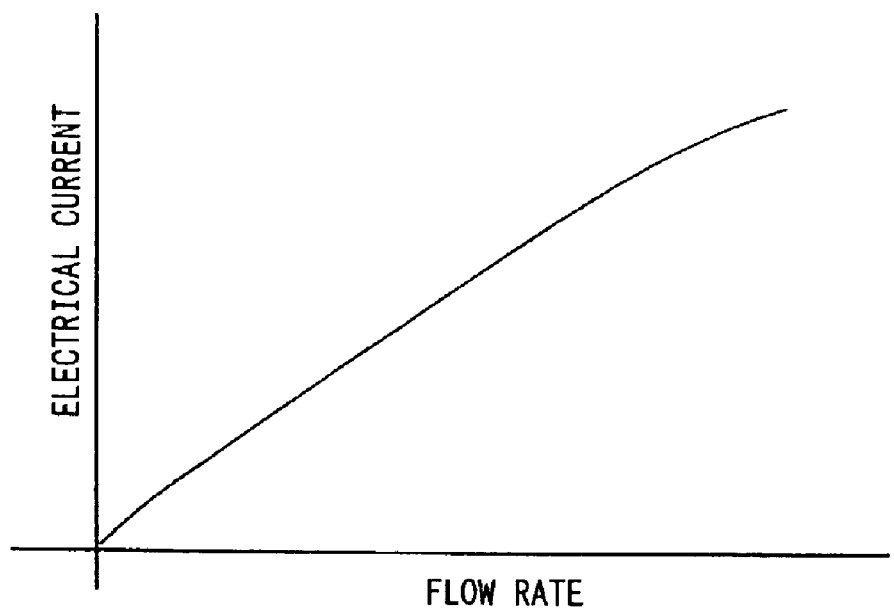
FIG. 6 is a graph showing the relationship between an applied electrical current and flow speed of the electroviscous fluid used in the second embodiment.

The invention also includes a function whereby an electrical current is generated in proportion to the speed of the EV fluid flowing between the electrodes 41. This function allows the fluid flow speed within the restrictor pipe 30 to be monitored, thus making it possible to monitor the movement condition of the lever 51. FIG. 6 shows the flow speed of the EV fluid in relation to the amount of the current flowing between the electrodes 41.

Other Embodiments as Relating to the First and Second Embodiments

Figure 7:
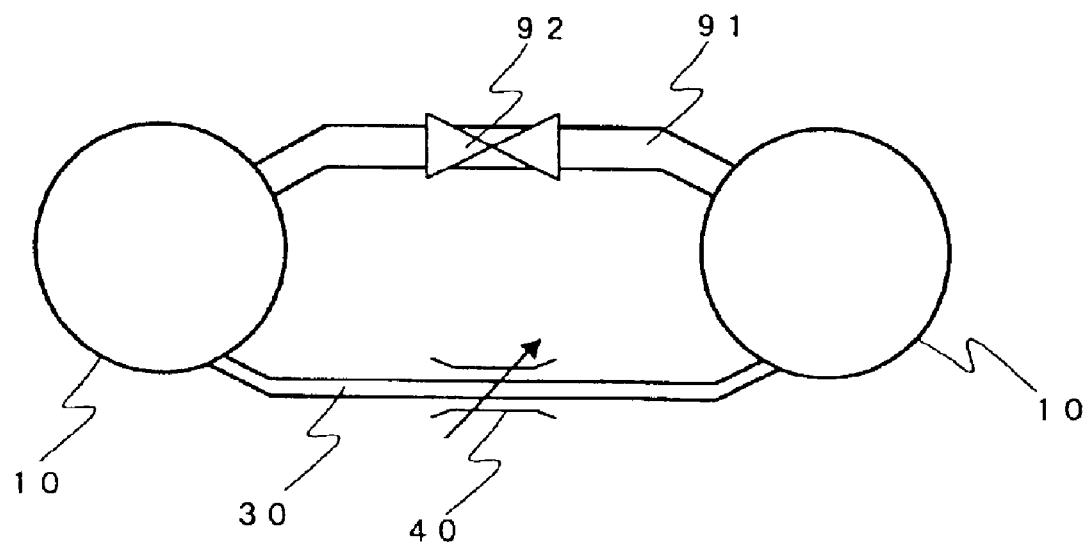
FIG. 7 is a diagram showing an additional configuration of a base point return means which can be applied to both the first and second embodiments.

In regard to the second embodiment, a means of monitoring the lever-induced position and displacement changes of the arm 53 and piston stroke can be utilized in place of the aforesaid voltage elements. Moreover, an elastic membrane may be installed on the top of the fluid chamber 10, and an arm 53 may be employed to apply force to the membrane as a means of changing the fluid volume within the fluid chamber 10. Furthermore, as shown in FIG. 7, a large cross section bypass pipe 91 may be connected to both the chambers 10, separate from the restrictor pipe 30, as a means of providing a base point return function that does not work automatically as the aforesaid centering spring mechanism. A valve 92 may be installed in the bypass pipe 91 as a means of manually or electrically controlling the fluid flow within the bypass pipe 91. For example, the valve 92 can be opened to allow fast fluid flow which will quickly establish a state of hydraulic equilibrium in the system, thus returning fluid volumes to their base points and providing a fast base point return action for the lever 51.

Third Embodiment

Figure 8:
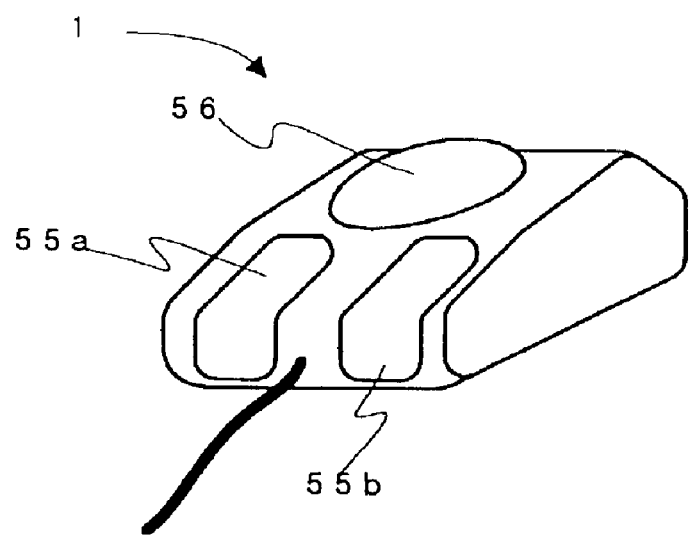
FIG. 8 is an external view of a third embodiment of the invention.

FIG. 8 shows an exterior view of a third embodiment of the man-machine interface invention in a configuration commonly known as a computer "mouse" pointing device. The mouse case is constructed with a flat bottom surface, control push-buttons 55a and 55b installed on its upper surface, and a connector cable installed to its front extremity. A roller ball is used in the lower case to track mouse movement directions. An elastic pad 56, which incorporates an elastic membrane as its upper surface, has been added to this conventional mouse structure. The pad 56 is structured so as to come into contact with the palm of the hand while the mouse is being operated, and is also structured so as to form the top of the aforesaid fluid chamber.

Figure 9:
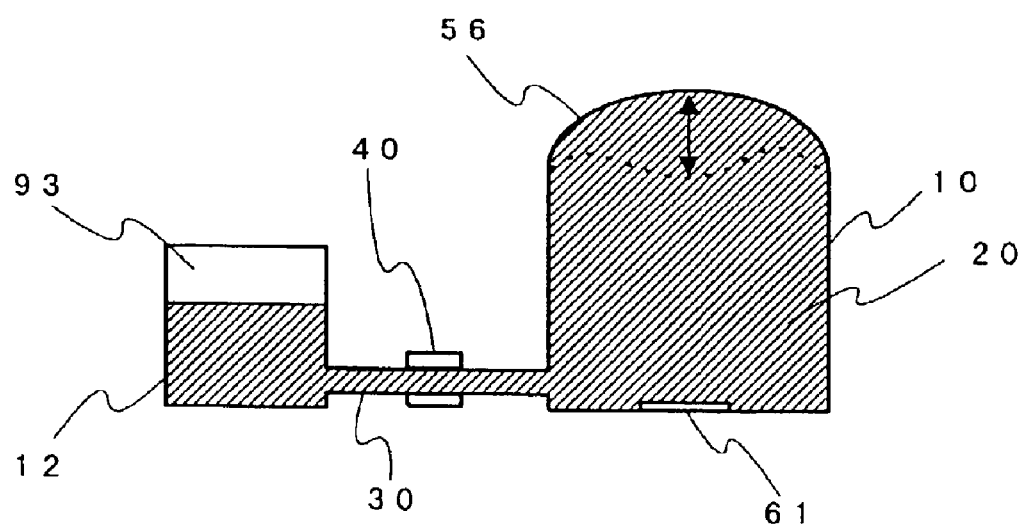
FIG. 9 is a cross sectional view of an elastic pad and fluid system of the third embodiment of the invention.

FIG. 9 is a schematic drawing showing a basic outline of the operation of the elastic pad 56. The pad 56 is structured so as to form the top part of the fluid chamber 10. When the elastic pad 56 is depressed as a result of pressure applied by the palm of the hand, the fluid within the chamber 10 passes into a sub-chamber 12 through the restrictor pipe 30. Because the sub-chamber 12 contains pressurized air 93, removal of the palm of the hand from the elastic pad 56 causes the pad 56 to return to its original shape as a result of fluid medium 20 flowing back into the chamber 10 due to the pressurization effect applied by pressurized air 93. Similar to the first and second embodiments, a voltage element 61 is installed within the chamber 10. Furthermore, a variable orifice type of a voltage driven actuator is installed to the restrictor pipe 30 to form fluid flow variable restriction means 40. A response control signal can be fed back from the host computer device in response to the amount the elastic pad 56 has been depressed. In this embodiment, the elastic pad 56 can be used, for example, to set an analog parameter, such as voice output volume, or to control the color density of the display. Also, while a conventional mouse provides an X- and Y-axis cursor control function, the elastic pad 56 can be utilized to move the cursor perspectively forward and backward in a Z-axis direction in order to provide simulated three-dimensional cursor control in perspective displays.

The third embodiment can be structured in a way to make use of an electroviscous fluid as was done in the second embodiment. Also, an elastic pad device similar to the pad 56 can be utilized for some or all of the mouse buttons.

The man-machine interface input device as prescribed by the invention is not limited to computer of other data processing applications, but can also be applied to video games as a device to control, for example, the movements of on-screen video characters or image elements. Moreover, the invention can also be applied to control devices used to operate robots, automated warehousing systems, and other types of mechanisms demanding manual control inputs. Furthermore, the configuration of the input device can be appropriately structured so as to meet the individual requirements and specific application of the host computer. Moreover, the input device can be applied as a means of realizing a higher level of control response based on an output signal from various host computer devices.

Accordingly, the present invention provides a control function whereby the responses of the controlled device closely and naturally correspond to the control movements of the operator manipulating the input device. The result is a more natural and responsive feeling of control when operating a host device to which the invention is connected.

The present invention also provides a highly responsive 2-dimensional directional control function.

The present invention provides a means of fluid flow control without the use of a variable mechanical valve device. Resultingly, fluid flow control becomes easier while the cost of the fluid control device is reduced.

The present invention further provides a simplified means of fluid flow control through the use of two electrodes oppositely oriented on two sides of a fluid flow channel.

The present invention provides means of changing the volume of a chamber through the manual operation of a lever and the addition of a simple mechanism to the chamber.

The present invention also provides means of responding to volume fluctuations in a chamber through corresponding sensations felt directly by the operator manipulating the invention. Reliability is increased, and cost reduced because the input device invention does not use a mechanically variable control means in its operation.

The present invention provides a lever operated input device in which a mechanically variable mechanisms is unnecessary, thereby allowing the input device to be made to smaller dimensions.

The present invention further provides a simple input control mechanism in which the need for a complex data processing operation is eliminated.

The present invention also provides a simplified structure in which control input movements are directly monitored as electrical signals.

The present invention provides a means by which the operator manipulating the input device can easily verify the point at which the fluid in the fluid chamber has returned to an initial volume. Furthermore, continuous operation of the input device is made easier as a result of the means.

What is claimed is:

1. A man-machine interface device for a computer, comprising:
   a first sealed chamber filled with a fluid medium, said first sealed chamber including at least an operational portion formed to change an inner volume thereof responsive to an operation of a user;
   a second sealed chamber connected to said first sealed chamber by a passageway so that said fluid medium is allowed to flow through said passageway between said first and second sealed chambers, said second sealed chamber containing gas medium for pushing back a fluid medium flown in from said first sealed chamber through said passageway during absence of the user's operation of said operational portion of said first sealed chamber;
   a sensor disposed in said first sealed chamber for generating electrical signals with respect to a detected change of a pressure of said fluid medium in said first sealed chamber;
   a transmission circuit through which the signals generated by said sensor are fed to a computer;
   a restriction device disposed in said passageway for variably controlling resistance to the fluid flow through said passageway; and
   a receiver circuit for driving said restriction device through the application of a control response signal applied to said restriction device from said computer.

2. A man-machine interface device as set forth in claim 1, wherein said operational portion of said first sealed chamber comprises an elastic membrane.

3. A man-machine interface device as set forth in claim 1, wherein said fluid medium is an electroviscous fluid and said restriction device a set of electrodes for applying a regulating voltage so as to vary a viscosity of said fluid medium as passing through said passageway.

4. A man-machine interface device as set forth in claim 1, wherein said sensor is a pressure sensor for said fluid medium contained in said first sealed chamber and a circuitry for transmitting an electrical signal generated by said sensor to said computer, thereby operation of the operator is input to said computer as an electrical signal representing change of pressure of the fluid medium in said first sealed chamber.

5. A man-machine interface device as set forth in claim 1, wherein said restriction device is an electrical voltage driven actuator installed to said passageway, electrical displacement changes of which controlling the volume of fluid medium flowing through said passageway.

6. A video game controller incorporating the man-machine interface device claimed in claim 1.

7. A computer mouse incorporating the man-machine interface device claimed in claim 1.

8. A computer mouse as claimed in claim 7, wherein said operational portion is disposed in a mouse body at a portion opposing against a palm of a user's hand.

9. A computer mouse as claimed in claim 7, wherein said operational portion defines a mouse button thereof.

* * * * *